(12) United States Patent
Jacob et al.

(10) Patent No.: US 7,573,152 B2
(45) Date of Patent: Aug. 11, 2009

(54) POWER SEQUENCING CIRCUIT

(75) Inventors: Mark Jacob, Wiltshire (GB); John Pennock, Midlothian (GB); David Dearn, Wiltshire (GB)

(73) Assignee: Wolfson Microelectronics plc, Edinburgh (GB)

( * ) Notice: Subject to any disclaimer, the term of this patent is extended or adjusted under 35 U.S.C. 154(b) by 135 days.

(21) Appl. No.: 11/783,397

(22) Filed: Apr. 9, 2007

(65) Prior Publication Data
US 2008/0024108 A1    Jan. 31, 2008

(30) Foreign Application Priority Data
Jul. 25, 2006   (GB)   .................... 0614710.2

(51) Int. Cl.
*H02J 3/06* (2006.01)
(52) U.S. Cl. ......................................... 307/19; 323/282
(58) Field of Classification Search .............. 307/18, 307/19; 323/282, 285, 268, 308, 266, 224; 363/28
See application file for complete search history.

(56) References Cited

U.S. PATENT DOCUMENTS

| 4,453,208 A * | 6/1984 | Middleton et al. ............ 700/11 |
| 6,237,103 B1 * | 5/2001 | Lam et al. .................... 713/330 |
| 6,429,706 B1 * | 8/2002 | Amin et al. .................. 327/143 |
| 6,791,394 B2 * | 9/2004 | Deboes et al. .............. 327/536 |

FOREIGN PATENT DOCUMENTS

| GB | 2 376 091 | 12/2002 |
| JP | 2005-295706 | 10/2005 |

\* cited by examiner

*Primary Examiner*—Albert W Paladini
(74) *Attorney, Agent, or Firm*—Dickstein Shapiro LLP

(57) ABSTRACT

The present invention provides a self-contained power management device, such as a power management IC or an IC including power management functions, which allow sequenced start up of power supplies without the need for an external sequencer and with a simple user configurable arrangement.

59 Claims, 14 Drawing Sheets

POWER SEQUENCING CIRCUIT

The present invention relates to power management devices and the like for managing and controlling power supplies. In particular, the present invention relates to power management integrated circuits or integrated circuits which include a power management function, such as circuits having multiple power outputs which can be controlled to switch on in a controlled sequence.

Power management devices are designed to provide a plurality of power supplies for powering different parts of a device which may require multiple separate supply rails with different voltages and which may need to be enabled at different times or in a predefined order. For example, a device may want to switch to a stand by mode where only a single power supply is needed to monitor basic functions whilst the other power supplies are shut down to conserve power. This can be important in battery-powered devices.

In addition, when a device is first powered up, it is often important for the separate power supplies to be switched on at different times. For example, it is normally desirable for a microprocessor to start up before an amplifier, or amplifiers, which are controlled, or fed, by its outputs are turned on. This avoids unpredictable outputs from the microprocessor causing undesirable noise such as audible "pops" or "clicks" to appear on the outputs of any already enabled amplifier. By properly starting the microprocessor first before energising any amplifier, the input to each amplifier should be stable and unwanted noise will be avoided.

Power ICs are provided in a number of different configurations offering differing degrees of control of output voltages. In general, there are a number of ways in which output voltage and start-up behaviour is controlled, including:

i) Fixed with no provision for adjustment after manufacture
ii) One-time adjustable, e.g. using non-volatile memory or fuses
iii) Many-time adjustable, e.g. using embedded EEPROM
iv) Programmable with external components, e.g. resistors, capacitors
v) Programmable with logic control signals, e.g. pin programmable or external EPROM
vi) Programmable with analogue control signals, e.g. external voltage reference In general, the greater the flexibility, the greater the cost of manufacturing the device and/or implementing it. It is therefore desirable to provide a device which can provide controllable sequencing of the power regulators within a device and also control of output voltage. External reference resistors are commonly used for providing flexibility in the selection of the output voltage of regulators, even in highly integrated power management integrated circuits (PMICs). This is principally due to the fact that surface mount resistors are small, accurate, stable and low cost.

FIG. 1 shows the external connections of a typical multiple regulator PMIC with external sequence control. FIG. 2 shows in more detail the internal structure of such a device. The figure shows three regulators, each of which has an input for receiving a reference input voltage VR1, VR2, VR3, for setting the output voltages Vo1, Vo2, Vo3. These reference voltages are derived from a source reference voltage $V_{REF}$ by simple resistor divider networks whose values or ratios can be selected to provide a desired reference input voltage for each regulator. The source reference voltage may be derived from on-chip or external circuitry. The input power for each regulator is typically supplied from an unregulated or previously regulated supply Vdd which may also power the internal circuitry of the regulators and other circuitry integrated in the circuit.

Each of the regulators also has an enable input (EN1, EN2, EN3) to switch on or off the respective regulator. This allows the regulators to be externally switched in a desired sequence.

FIG. 3 shows a variant of the structure of FIG. 2. In this arrangement, the output of each regulator is fed into a resistor network such that the voltage fed back to the input of the respective error amplifier 31 via respective fed-back voltage input, FB1, FB2, or FB3, is lower than but proportional to the respective output voltage. This allows the output voltage to be higher than the respective input reference VR1 etc. and possibly higher than the source reference voltage ($V_{REF}$). One or more of the reference voltage inputs may be tied directly to $V_{REF}$ or any suitable reference voltage.

Thus, the PMICs of FIGS. 1 to 3 can be arranged to provide different, selected voltages from each regulator and can be controlled to switch on in a predetermined sequence. However, these circuits require additional, external, circuitry to provide the sequencing signals to the enable inputs to properly control the regulators. Such additional circuitry adds system complexity and cost to the final application. There is also the problem of how to derive and control the power-supply for this external circuitry during initial power-up, before the controlled and regulated power supplies become available.

It would therefore be desirable to provide a self-contained device, such as an integrated circuit, containing most of the circuitry necessary to control the regulator start up sequence whilst still providing flexible selection of output voltage and sequencing, with at most only a few cheap external components.

Therefore, according to the present invention there is provided a power management device comprising: a plurality of power regulators, each regulator comprising a regulator input and a regulator output, wherein each power regulator is controlled according to the voltage on the respective regulator input; a sequencer for providing a plurality of sequencer outputs, a plurality of device outputs, each coupled to a respective power regulator output; and a plurality of device inputs, each coupled to a respective power regulator input, wherein, in use, each sequencer output is couplable to a node of one or more voltage networks, each having input voltage nodes and an output voltage node, to modify the voltage on the output voltage node of said one or more of the external voltage networks, and each device input is couplable to the output voltage node of a respective one of said one or more of the external voltage networks.

The voltage network may be external to the device, or may be a part of it. It may be adjustable or programmable by means of switches or otherwise (e.g. laser trimmable where the device is an integrated circuit device).

The regulator input may be an analogue voltage input used to define the desired output voltage. Alternatively, the input may be a feedback voltage coupled to the regulator output for controlling the output voltage to follow a second regulator input voltage.

In one aspect of the invention, the voltage networks are preferably connected between an upper voltage source and the sequencer outputs. This allows the voltage on the output voltage nodes of the voltage networks to float toward the upper voltage source level when the sequencer outputs are not enabled. When the sequencer outputs are enabled by connecting one end of the voltage network to the appropriate voltage supply, the voltage network operates in a normal divider mode. The voltage networks are preferably formed as simple resistor dividers although they may be formed in a number of ways such as a resistor connected in series with a zener diode, an LED, or a voltage regulator. The resistor network may include programmable or switcheable resistors to allow varying of the size and hence voltage output by the network.

Enable control for each regulator may be provided by an implicit or explicit comparator function which monitors the reference input and source reference voltages as necessary. The comparator detects when the voltage on the reference input is close to or equal to the source reference voltage and its output will disable the regulator. The comparator output may be latched.

In one preferable aspect of the invention, the sequencer selectively couples the sequencer outputs to a lower voltage source to couple the respective one or more voltage networks to said lower voltage source. The respective power regulator is disabled when the voltage on the respective analogue control input is within a first range.

The sequencer outputs can be coupled to the one end of the voltage network. In this way, the voltage network operates to divide the applied voltage to provide an intermediate voltage on the output. In this case, the regulator is to be disabled when the sequencer does not connect the voltage network to the lower voltage source. The output node of the voltage network then rises. Therefore, the first range relates to voltages above a first threshold around the upper voltage source. As the voltage on the output node may be slightly below the voltage of the upper voltage source, the first threshold is preferably close to the upper voltage source although it may be slightly below, to allow the comparator to properly detect when the input is at a level indicative of the regulator being disabled. The comparator may include an offset to compensate for this small difference.

The sequencer outputs may alternatively be connected to the output node of the voltage network. If the sequencer is enabled, then the output node will be pulled down to the lower voltage source level. When the sequencer output is not enabled, the output node of the voltage network will be at an intermediate voltage between the upper and lower source voltages. Consequently, the regulator is to be disabled when the sequencer output is enabled and the output is at the lower voltage source level. In this case, the first predetermined range extends down from a second threshold. The second threshold is preferably at the lower voltage source although it may be a little above that for similar reasons to those mentioned above. Again a suitable comparator input offset may be used.

In a second preferable aspect of the invention, the sequencer selectively couples the sequencer outputs to an upper voltage source to couple the respective one or more voltage networks to said upper voltage source and wherein each power regulator is disabled when the voltage on the respective input is within a second predetermined range.

In a first configuration, the voltage divider networks are preferably connected between the lower voltage source and the sequencer outputs. This allows the voltage on the output voltage node of the voltage network to float down to the lower voltage source when the sequencer outputs are not enabled. When the sequencer outputs are enabled, to connect the top of the voltage divider network to the upper voltage source, the voltage network operates in a normal divider mode to provide an intermediate voltage to that applied to each end of the voltage network.

When the sequencer output is not enabled, the output voltage nodes drop to the lower voltage source level. The input voltage to the regulator is therefore at the lower voltage source and so the regulator is in effect being controlled to produce no output and is fully turned off. Alternatively an explicit comparator may be used for enabling the regulator, especially if its logic output is also to be used for other purposes such as system monitoring. The second predetermined range will therefore extend downwards from a third predetermined threshold. The third predetermined threshold is preferably at the lower voltage source level or just above.

In an alternative configuration of the second aspect, the sequencer outputs are connected to the output node of the voltage network. When the sequencer output is enabled, the output voltage nodes rise to the upper voltage source level. The input voltage to the regulator is therefore at the upper voltage source level. When the regulator is disabled, the voltage network operates in a normal divider mode. A comparator may be used, to determine if the voltage on the output node is in the second predetermined range which will therefore extend upwards from a fourth predetermined threshold. The fourth predetermined threshold is preferably at the upper voltage source level or just below.

In a third preferable aspect of the invention, the sequencer selectively couples the sequencer outputs to an upper voltage source to couple the respective voltage networks to said upper voltage source, wherein each power regulator is disabled when the voltage on the respective input is within a third predetermined range. The third predetermined range is preferably extends upwards from a fifth predetermined threshold reference voltage.

The voltage networks are preferably connected between the output of the regulator and the lower voltage source. This causes the voltage on the output voltage nodes of the voltage network to be raised up to the upper voltage source level when the sequencer outputs are enabled and operate in a normal divider mode when the sequencer outputs are not enabled. In this way when the sequencer wishes to enable a regulator, the sequencer output is controlled to disconnect the upper voltage source from the voltage reference node of the voltage network. The voltage network then divides the output voltage from the regulator to provide a feedback voltage for controlling the regulator.

When the sequencer output is arranged to connect the upper voltage source to the output voltage node, the input voltage to the regulator is therefore at the upper voltage source. This voltage acts as a feedback voltage to the regulator and so the regulator is driven as if it was providing too high an output and so its output is turned off more and more until it is fully turned off.

The output node of the voltage network is preferably used to provide the feedback voltage for controlling the regulator. This is preferably compared to a source reference voltage. The fifth predetermined threshold voltage is preferably above this comparison voltage.

In many embodiments the sequencer outputs may optionally be switched to a high impedance mode to act as an enable input for directly and asynchronously enabling or disabling an associated one of the power regulators. This allows the device to be used in a more traditional external enable signal driven mode giving greater flexibility to the use of the device.

The sequencer may be arranged to sequentially switch on the sequencer outputs with a delay between each. The delay between each can be controlled by an externally provided timing signal to the sequencer. Alternatively, the delay may be internally controlled or determined according to externally connected components such as capacitors or resistors.

The sequencer advantageously includes means for delaying the switching of a sequencer output until after a previous sequencer output has been switched and any regulators controlled by it are fully operational. This ensures that when one regulator is enabled, it is fully operational, i.e. all capacitance connected to it has been charged and any start up surge demand has been met, such that it has reached its correct operating voltage.

The sequencer may switch on each regulator according to a simple serial pulse train input to it. However, it may also use a more complex controller method to allow coded instructions to selectively enable or disable regulators.

The present invention also envisages a highly flexible device which can be operated in the configuration of any of the aspects and configurations mentioned above. In this arrangement, the sequencer outputs can be selectively connected to either of the upper or lower voltage sources or left in a high impedance state. The regulators are also preferably provided with a number of comparators so as to make some or all of the following comparisons: the input voltage to the upper source voltage; the input voltage to the lower source voltage; and the fed back voltage to the upper source voltage.

The outputs of these comparators can then be used to control the operation of the regulators according to the desired implementation.

The device described above can be implemented in a number of ways but is preferably embodied in an integrated circuit. This provides a single device which can operate with only a few additional components to form the voltage networks. Furthermore, the voltage networks may even be formed within the IC and adjusted according to specific applications.

The present invention is particularly suited to use with devices which have multiple applications which are preferably started up in a specific order. These may include devices such as portable media devices, portable computers, telephones, etc. To this end, the invention may be used to power disc drives, flash memory, applications processors, audio codecs, video codecs, wireless communication devices, etc.

The arrangements referred to above define upper and lower supplies but the invention may be implemented in circuits of opposite polarity, which are basically "mirror images" of the above where upper and lower are swapped.

Optionally, the devices may have multiple voltage power source inputs, either deliberately to accept different voltages, for example to even the outputs of other on-chip regulators, or just to ease the distribution of fat power metal on the chip.

The sequencer outputs can be connected to the appropriate upper or lower source voltages using any suitable switch. These can include NMOS, PMOS (especially the high-side switches), bipolars, and JFETs. Where the device is implemented as an IC, the choice of switches may be based upon the IC manufacturing technology chosen.

The present invention also provides a method of controlling a power management device comprising a plurality of power regulators for use with one or more voltage networks having input voltage nodes and an output voltage node, the method comprising: receiving a sequencer control signal; switching each of a plurality of output signals in response to said sequencer control signal, each output signal being for selectively controlling the output of one or more of said voltage networks, wherein said output signals modify the voltage on the output voltage node of said controlled voltage networks; and controlling said regulators to operate according to a received input reference voltage from a respective one of said voltage networks.

The power management device being controlled is preferably an integrated circuit device.

The present invention will now be described in more detail by reference to specific examples and with reference to the following drawings, in which.

Figure 4:
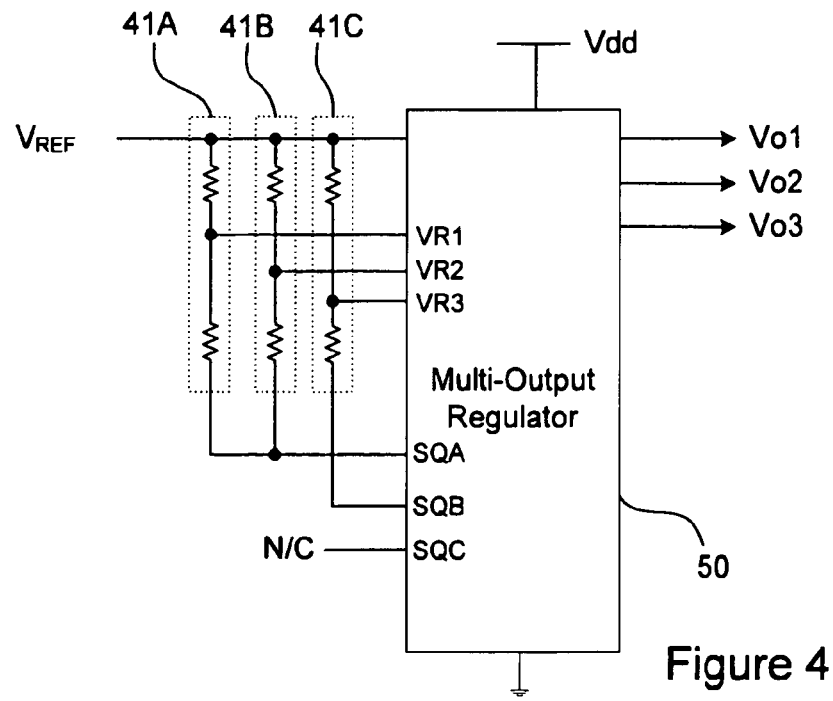
Figure 5A:
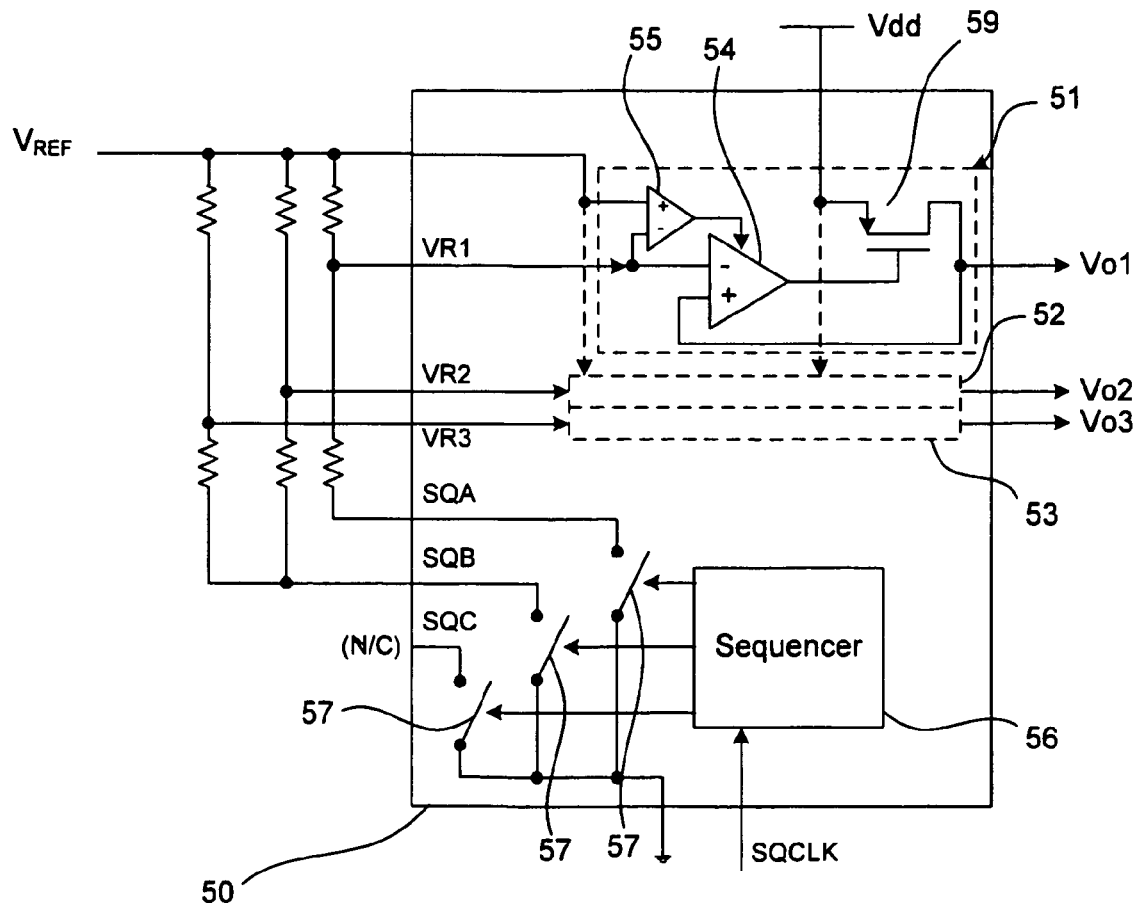
Figure 5B:
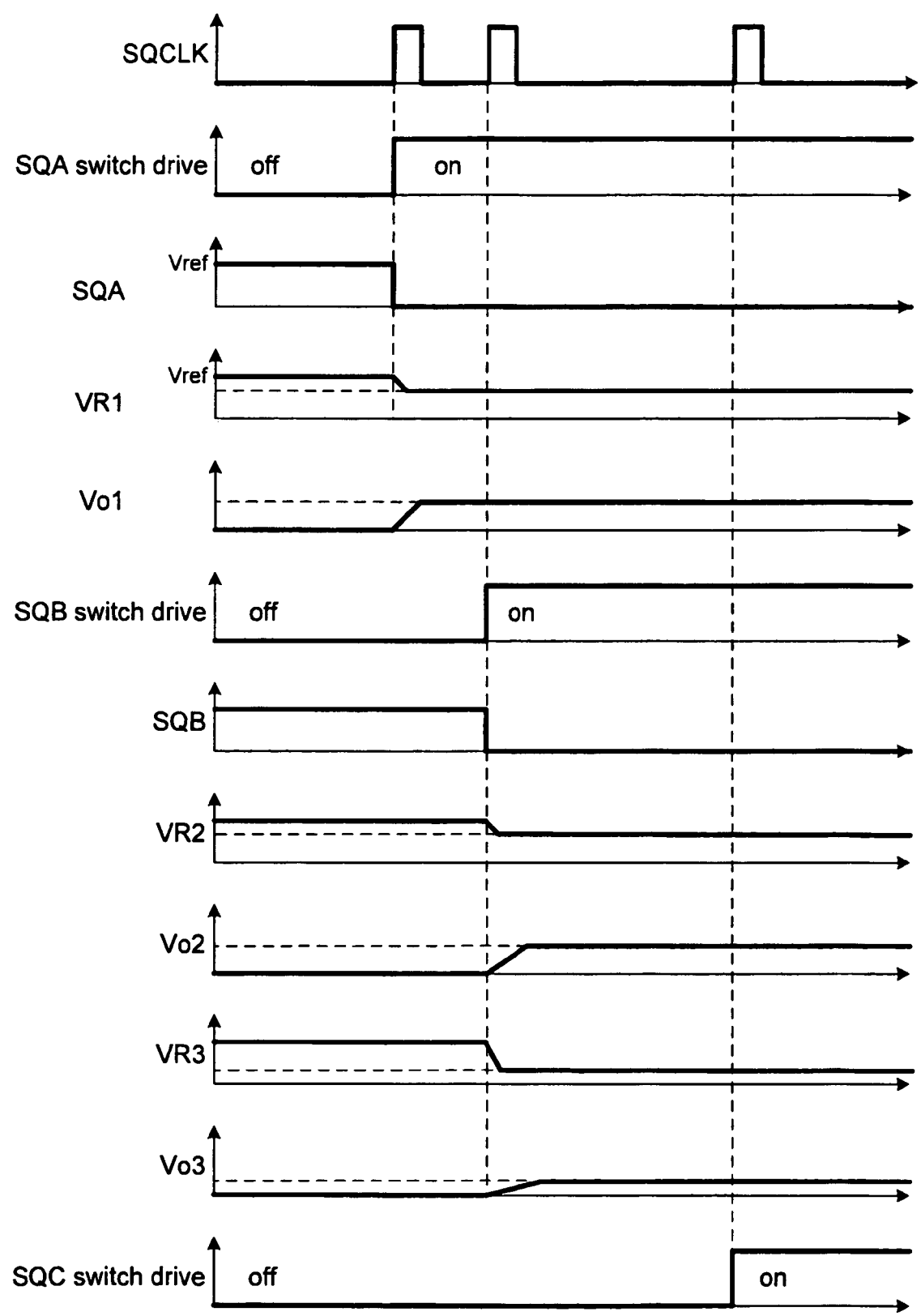
Figure 5C:
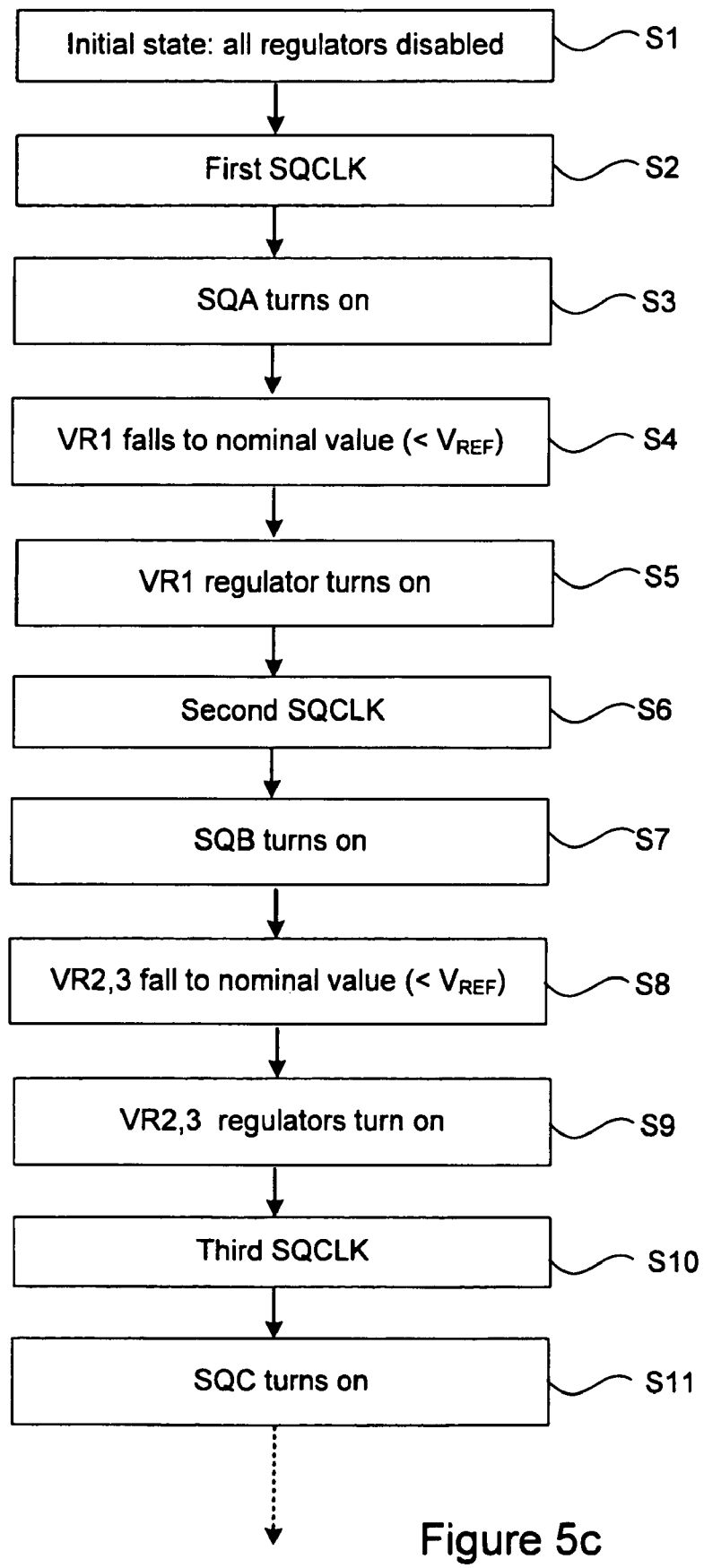
Figure 6:
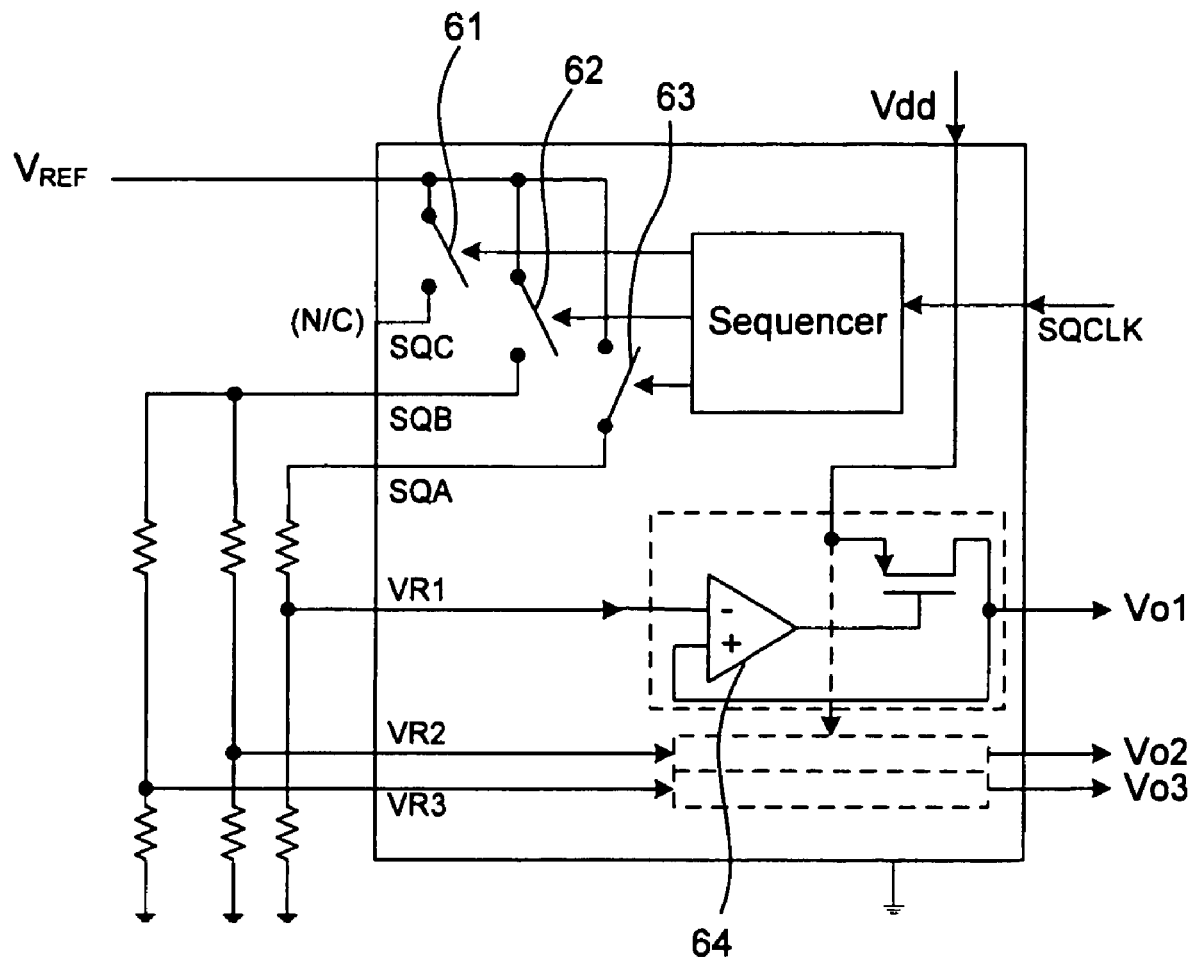
Figure 7:
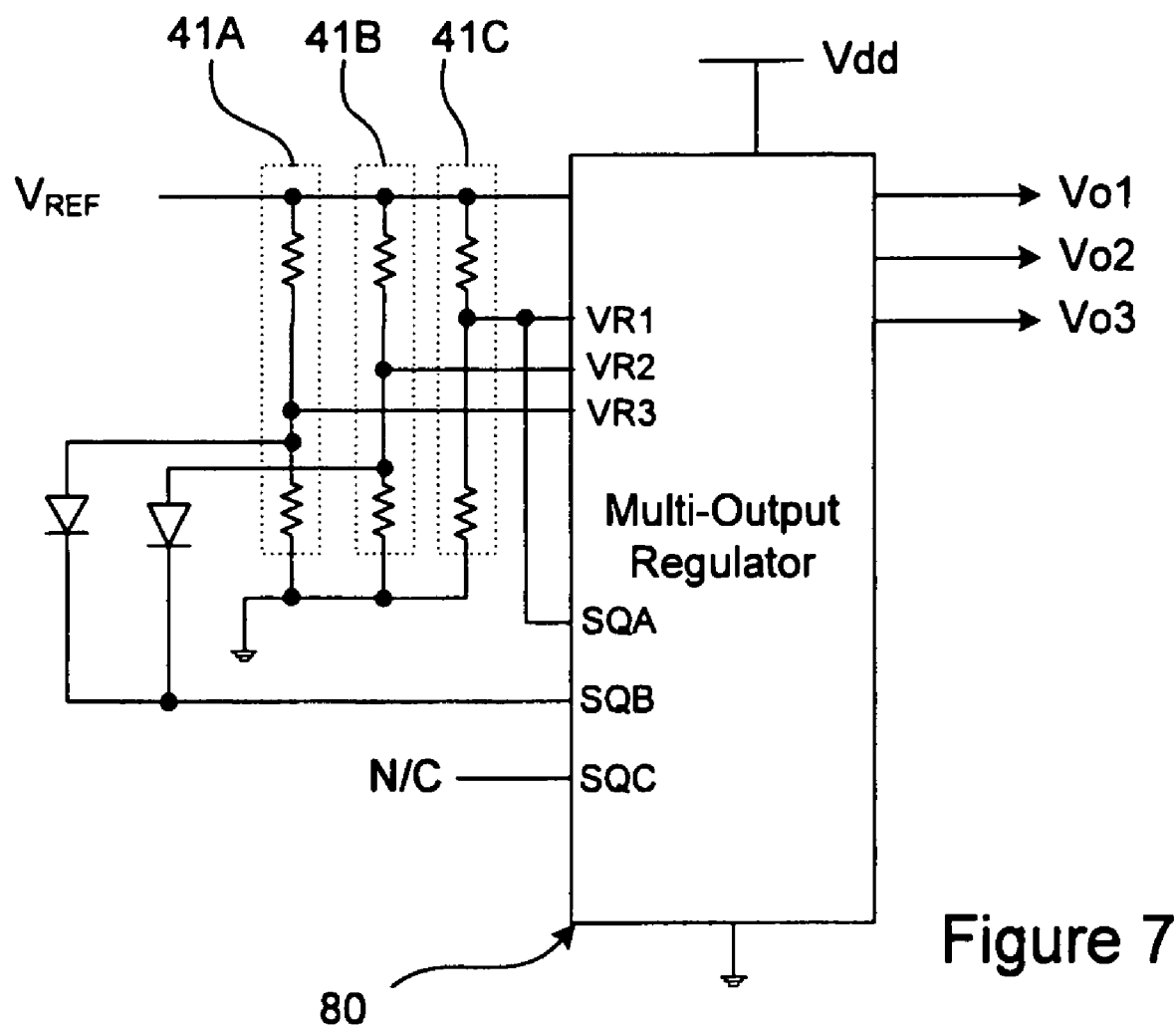
Figure 8:
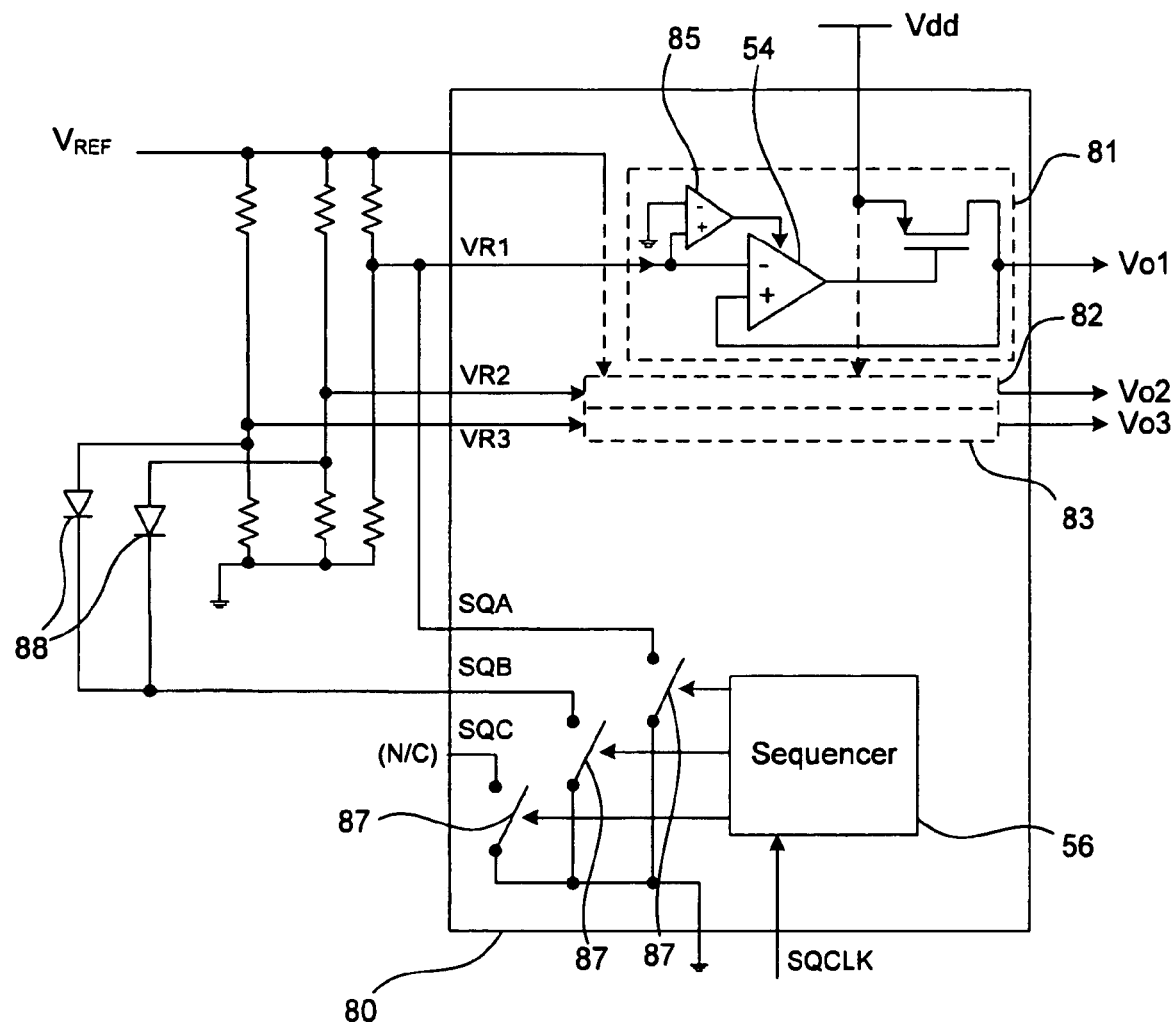
Figure 9:
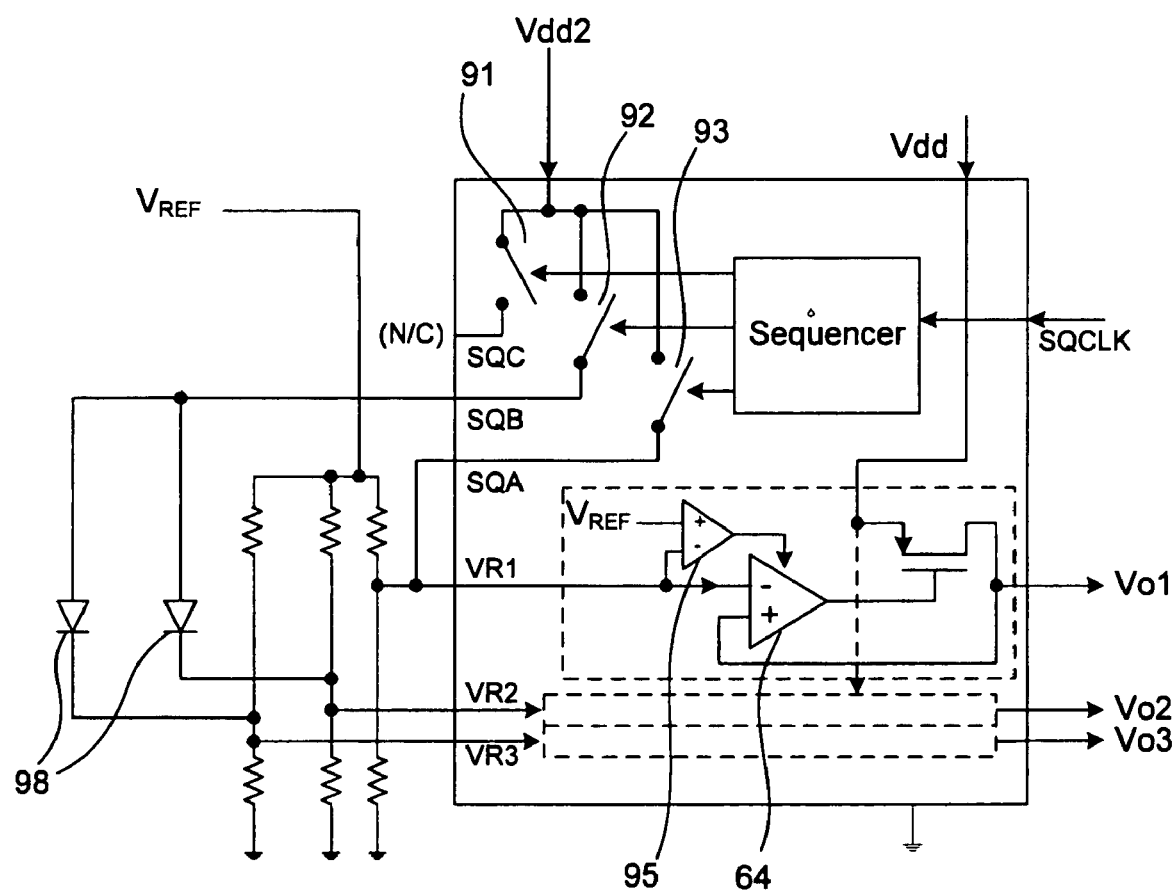
Figure 10:
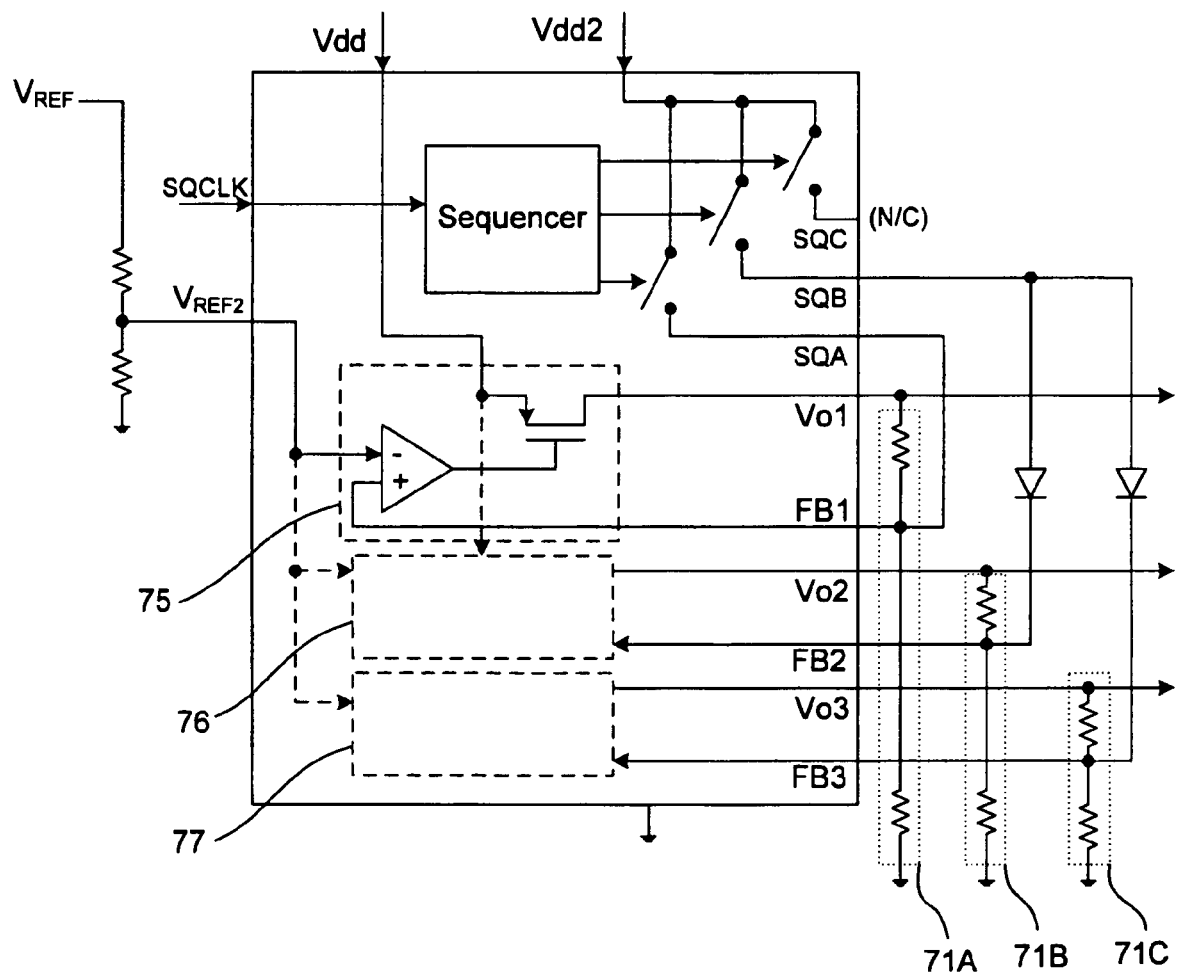
Figure 11:
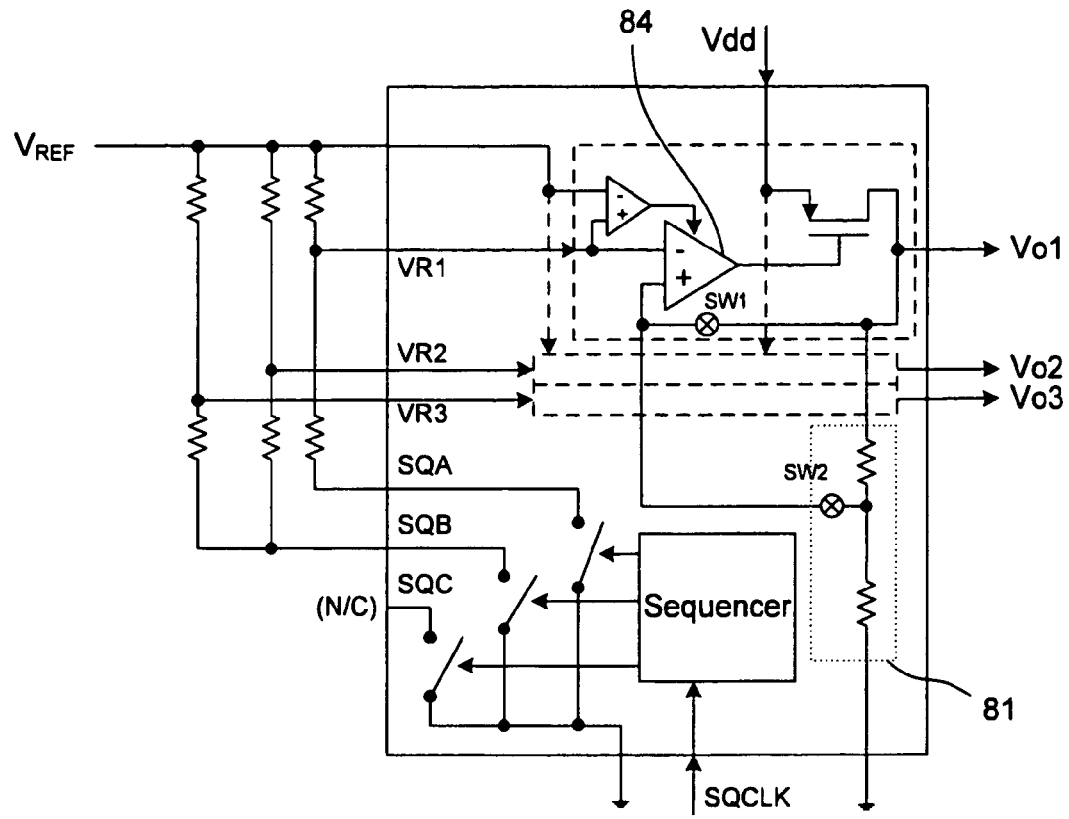
Figure 12:
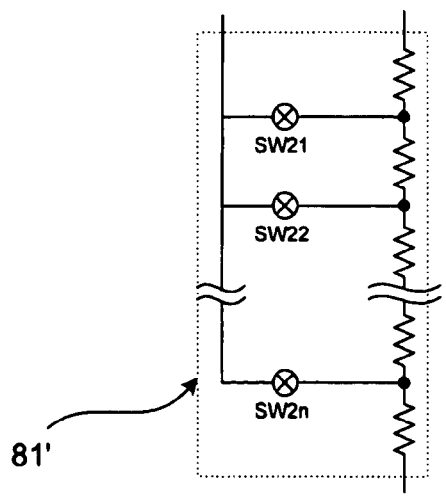
Figure 13:
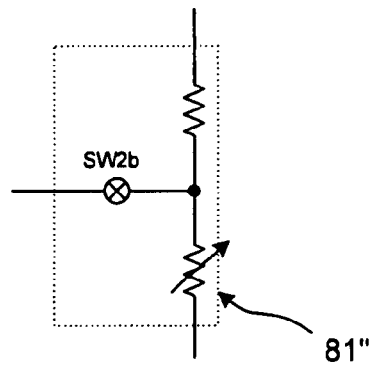
Figure 14:
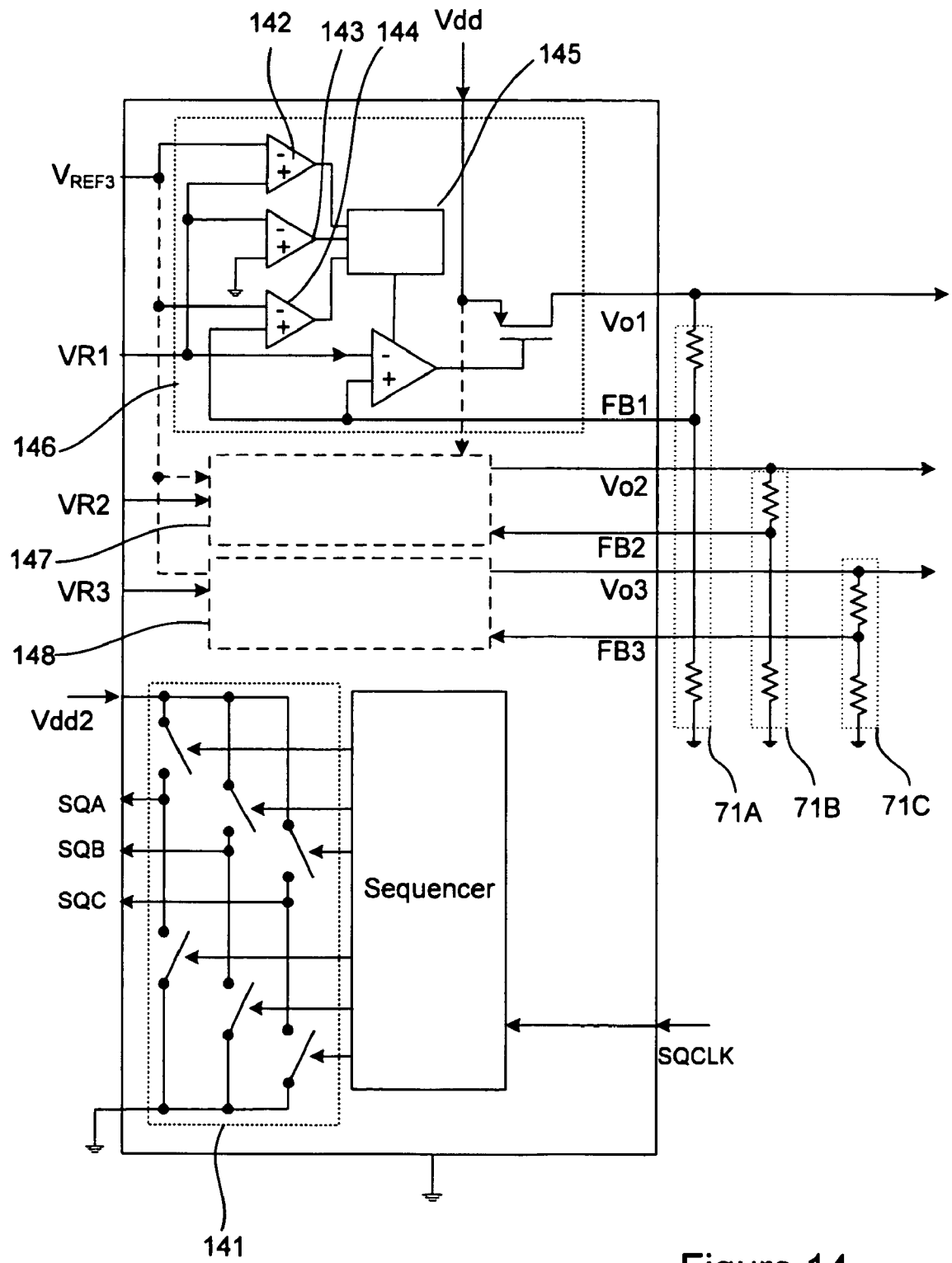
Figure 15:
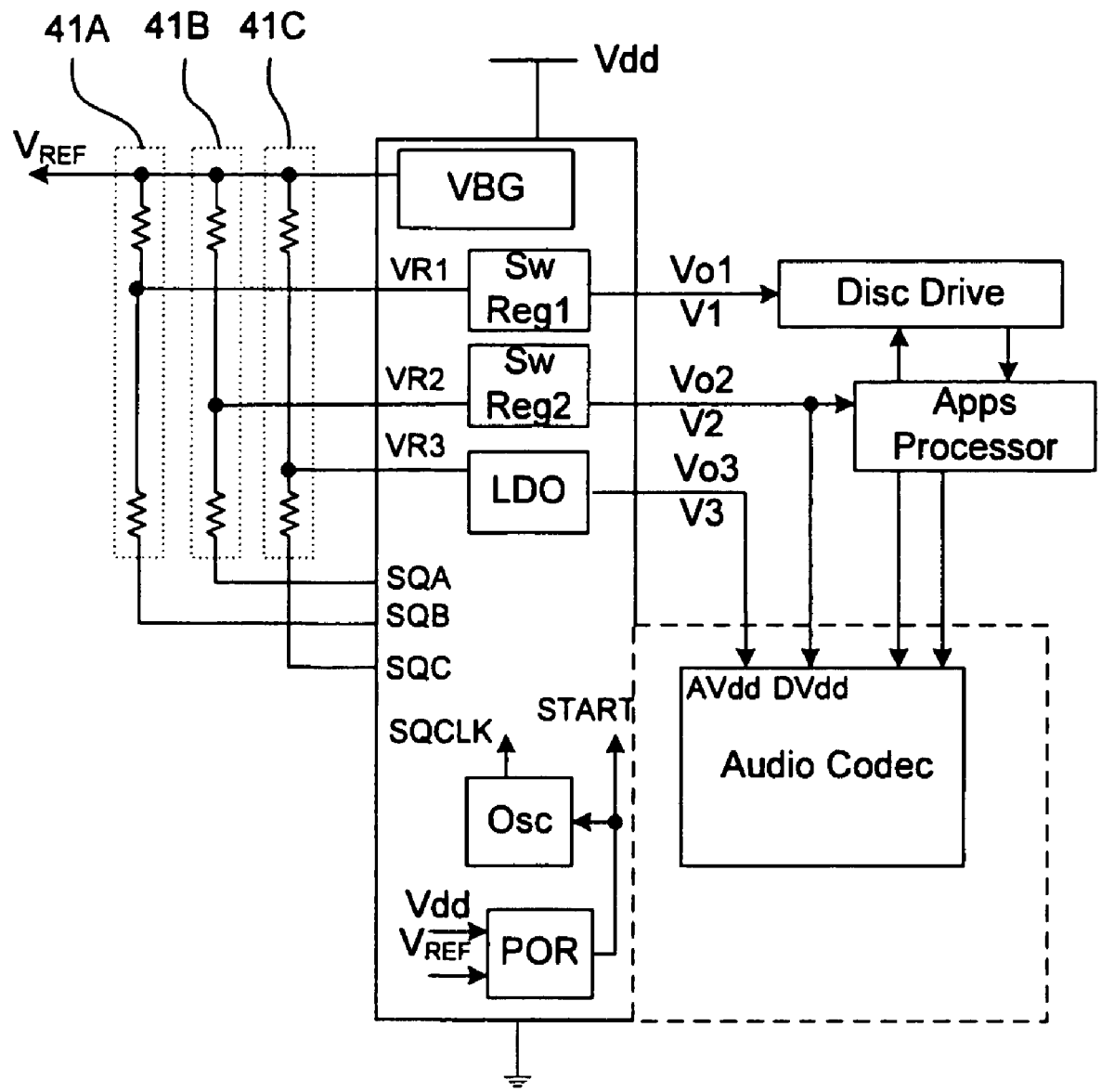
Figure 16:
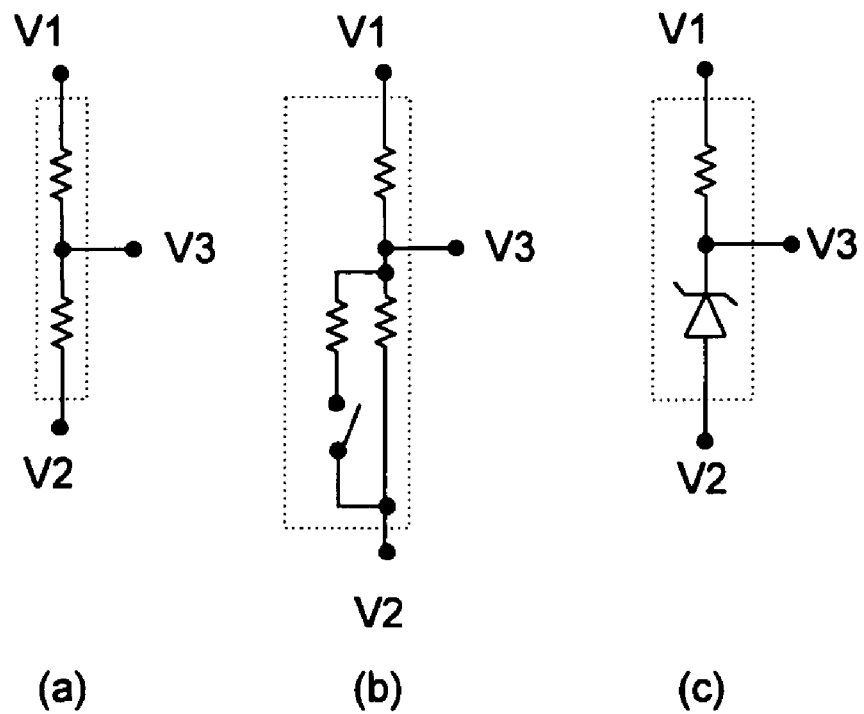
Figure 16:
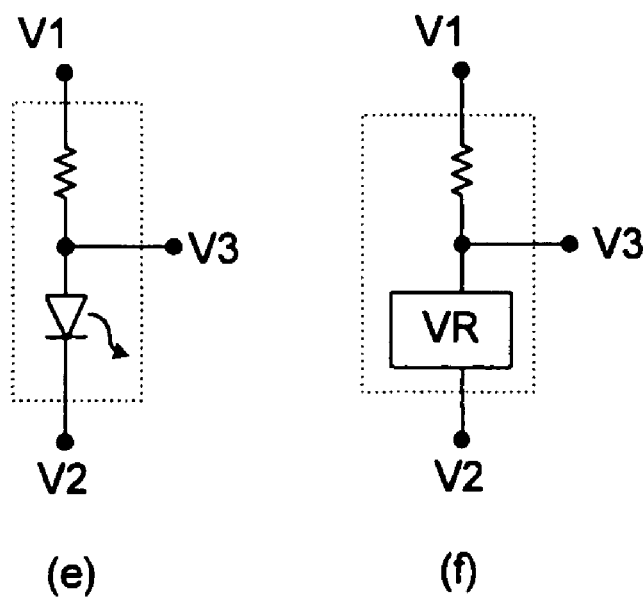

FIG. 4 schematically shows a device according to an aspect of the present invention;

FIG. 5a shows a device according to an aspect of the present invention in more detail;

FIG. 5b shows a switching diagram for the device of FIG. 5a;

FIG. 5c shows a flow diagram for the operation of the device of FIG. 5a;

FIG. 6 shows a device according to a further aspect of the present invention;

FIG. 7 shows a another device according to the present invention;

FIG. 8 shows the arrangement of FIG. 7 in more detail;

FIG. 9 shows a further device according to the present invention;

FIG. 10 shows another arrangement in accordance with the present invention;

FIG. 11 shows a modified version of the device of FIG. 5a;

FIG. 12 shows a modified resistor divider network arrangement of the device of FIG. 11;

FIG. 13 shows a further modified resistor divider network arrangement of the device of FIG. 11;

FIG. 14 shows an arrangement which provides universal functionality;

FIG. 15 shows a specific implementation of an embodiment of the present invention; and FIG. 16 shows alternative arrangements for the resistor divider networks.

FIGS. 4 and 5a illustrate an embodiment of the invention comprising an integrated circuit device. The device comprises a plurality of supply regulators and with a series of controlled sequencer outputs for providing predetermined time-sequenced output control signals. These allow the device to be configured to provide a selected one of a plurality of possible start up sequences of the supply regulators. An internal sequencer controls the switching of the sequenced outputs. These sequencer outputs are used to drive nodes of voltage divider networks and thus to enable respective regulators in turn.

The device of FIGS. 4 and 5a provides sequenced outputs which can be coupled to voltage reference networks such as the simple resistor networks shown. The outputs are used to modify the voltages on the output of the networks which provide the reference inputs VR1, VR2, VR3 to the device. In this way, the device can be used to provide controlled start up of the regulators by adjusting only the external components in the resistor network.

FIG. 4 shows a representation of the external connections for providing sequenced start up. In this arrangement the IC 50 includes three regulators and three sequencer outputs SQA, SQB, SQC. It will be appreciated from the following description that these numbers do not need to be the same and can be varied independently. As above, a reference voltage VREF is available, either supplied externally or derived within the circuit 50.

When the device is powered on, the outputs SQA, SQB, SQC are initially floating; connected to the upper supply rail; or connected to ground through a large impedance. In other words, the current flow through the resistor dividers 41A, 41B, 41C is zero, or at least low enough that outputs (VR1, VR2, VR3) rise to close to the reference voltage $V_{REF}$. As described below, this controls the regulators to stay switched off and so no output is provided. After a period of time, the sequencer causes SQA to switch state and be grounded, i.e. connected to ground via a low impedance. This causes the resistor dividers 41A, 41B connected to SQA to operate normally and to each generate a reference voltage according to the ratio of their respective resistors. These two reference voltages are provided as VR1 and VR2. Once the input voltages VR1 and VR2 drop below the voltage $V_{REF}$, the regulators start to operate normally to produce output power according to those input voltages.

Subsequently, SQB changes state and goes low pulling one end of resistor network 41C low and hence bringing resistor network 41C into normal operation. Similarly, VR3 then changes from $V_{REF}$ to a value corresponding to its resistor ratio and the regulator starts to output power.

It is apparent that a designer can choose which resistor networks are to be connected to each of the outputs SQA-SQC. In this way, one or more regulators can be arranged to switch on as each of the outputs SQA-SQC changes state. In some cases, such as SQC in the example of FIG. 4, one or more of the sequencer outputs may be superfluous, so can be left unconnected. The result is that two of the regulators are enabled initially followed by the third subsequently. The outputs SQA-SQC are arranged to switch to their low state sequentially. This allows the external connections to be selected to enable the appropriate regulators in the right sequence simply by connecting the respective resistor network to the desired sequential output.

This arrangement allows the sequencer to be integrated into the IC with the regulators whilst still allowing the voltage output for each regulator and the start up sequence to be controlled by selection of external resistors and connections to the chip.

FIG. 5 shows a more detailed structure of a device 50 according to the present invention. As in the example of FIG. 4, the device 50 includes three regulators 51, 52, 53 and three sequenced outputs SQA, SQB, SQC. In this case, regulators 52 and 53 are coupled to output SQB whereas regulator 51 is coupled to output SQA. The sequenced outputs are switched on starting with SQA, then SQB and finally SQC (not used in the configuration shown). The sequencer enables the switches 57 for each of the outputs to bring the bottom of the resistor network down to ground, as described above.

Regulator 51 is shown in this example as a low-drop-out (LDO) regulator, comprising pass transistor 59, a comparator 55, and a feedback or error amplifier 54. Error amplifier 54 controls the gate of pass transistor 59 to control the output of the regulator to be equal to the input reference voltage VR1.

When the device is initially started up, the sequencer outputs SQA, SQB, SQC are all high impedance and so the inputs VR1, VR2, VR3 are all close to $V_{REF}$. The comparator 55 senses that VR1 is close to $V_{REF}$ and its output stays low. The output of comparator 55 drives the enable input of amplifier 54 low, thus keeping amplifier 54 disabled which in turn keeps the regulator output disabled.

The output of the resistor networks will normally be close to $V_{REF}$ rather than equal to it as there will usually be some current through the network and hence some small voltage drop across the resistor. Although shown with one input connected to $V_{REF}$, in practice, the comparator will be designed to have a small offset voltage and probably some hysteresis to allow for VR1 not exactly reaching $V_{REF}$ and for possible extraneous noise. For simplicity, in the foregoing, this slight offset will be ignored and it will be assumed that the voltage on VR1 does reach $V_{REF}$.

Once the sequencer 56 enables the switch for output SQA, then SQA is connected to ground with a low impedance and the voltage on VR1 drops to its predetermined reference voltage determined by the ratio of the resistors. Once the voltage of VR1 drops below $V_{REF}$, the comparator 55 senses the difference between VR1 and $V_{REF}$. This causes the comparator to switch so as to enable the amplifier 54. This in turn controls the pass device 59 to provide output power from the regulator output Vo1.

Subsequently, as SQB is enabled by the sequencer, the inputs VR2 and VR3 both drop to their respective values and comparators in regulators 52 and 53 enable respective amplifiers to switch on the regulators.

Where several similar regulators are used, it is not essential for each regulator to have a dedicated comparator 55. A single comparator may be used in a polling mode. In this way, the comparator sequentially monitors one of the inputs VR1-3 and provides an output to the enable line of the respective comparator.

The switching of the sequencer can be controlled in a number of ways. In FIG. 5a, an input clock, SQCLK allows the sequence timing to be controlled externally. This allows the exact timing of the switching on of the regulators to be controlled by an external trigger. Equally, the timing may be controlled internally with say a fixed delay between each of the outputs switching on. This timing could be controlled by an external component to adjust the switching interval. For example, external capacitors and/or resistors could be used to determine the switching interval.

Thus a user can configure the exact timing sequence for each regulator by selection of which sequenced output the resistor network is terminated to and by the timing of the sequencer steps.

FIG. 5b shows an example of the timing of the switching operations of the circuit of FIG. 5a. FIG. 5c shows schematically the series of steps (S1-S11) used in starting the regulators. The timing signal SQCLK provides a series of signal pulses used for controlling the operation of the sequencer 56. Initially, each of the switches 57 are open and the sequencer outputs are floating. Consequently all the regulators receive a high input voltages on VR1, VR2 and VR3 causing them to be disabled (S1).

As the first pulse is received on SQCLK (S2), the sequencer switches on the output SQA (S3) and SQA is connected to ground bringing the bottom of the resistor network down to ground potential. The voltage to VR1 then settles to the predetermined ratio set by the resistor values (S4). As VR1 starts to fall, the comparator 55 enables the feedback amplifier and the regulator begins to operate normally providing output voltage Vo1 (S5).

Some time later, a second pulse on SQCLK (S6) causes the sequencer to switch on the output SQB (S7). As SQB connects to ground, the voltages on VR2 and VR3 drop to their nominal values (S8) and regulators 52 and 53 begin to operate (S9).

Subsequently, another pulse on SQCLK (S10) causes the sequencer to switch on output SQC (S11). In the arrangement of FIG. 5a, this is not connected and so has no effect but it could be used to control other regulators not shown in FIG. 5a.

The above description uses a simple sequential activation of the sequencer outputs. This arrangement provides a simple and effective method of controlling the sequencing of the regulators. However, the SQCLK signal may be a more complex signal to provide more complex control of the sequencer. For example, the signal may be used to identify specific sequencer outputs and indicate whether they are to be turned on or off. This may be useful for controlling shut down or partial shut down of a device as well as start up.

Regulator 51 could take one of a number of other forms known in the art. For instance it could be a linear shunt regulator or switching regulator of buck, boost, buck-boost, inverting, or other structure, to optimise the design for particular system requirements, for example efficiency or output noise. Each of the other regulators, 52, 53, may have a similar structure to regulator 51, or some regulators may have different structures.

The switches 57 shown may be implemented in a number of ways, for example as NMOS or PMOS FETs, bipolar transistors, or any structure whose resistance between two terminals is controllable via another terminal.

The sequencer outputs have been described above as being initially floating or connected to ground only through a high impedance. Alternatively the sequencer outputs may be driven to $V_{REF}$, or to some other voltage higher or equal to $V_{REF}$ such as Vdd. System operation will be the same. Although requiring a more complex sequencer output stage, this may avoid effects due to interference coupling onto the floating outputs in noisy environments.

FIG. 6 shows a modified version of FIG. 5a. In this example, the resistor networks are permanently connected to ground with the upper part of the resistor network connected to $V_{REF}$ via sequencer outputs SQA, SQB, SQC. In this arrangement, when the device starts, the sequencer initially disables the switches 61, 62, 63. As no significant current flows through the resistor networks, the voltages provided to inputs VR1, VR2 and VR3 are effectively ground. The input VR1 is provided directly to the amplifier 64. In this arrangement, the additional explicit comparator 55 can be omitted because the low input voltage to the amplifier 64 simply switches off the drive to the regulator to thereby provide a 0V output, in other words, it is turned off. Otherwise, the control of the sequencing is the same as that in FIG. 5a. Alternatively an explicit comparator can be used, especially if its logic output is also to be used for other purposes such as system monitoring. Again the comparator may be designed with a deliberate input offset voltage and hysteresis.

In the embodiment of FIG. 6, the reference input voltages will rise from zero to the desired voltage after the sequencer output switches. This may help the regulator give a smooth turn-on, especially if there is decoupling capacitance on the reference input voltage node. In the circuit of FIG. 5a, the reference input voltage will have to drop from $V_{REF}$ to the desired voltage, so the regulator design may include means to avoid an initial overshoot of the regulator output voltage.

Arrangements of the type shown in FIGS. 5a and 6 prevent current flow in the resistor divider networks when the regulators are disabled. This is advantageous if the supplies are not enabled for a protracted period of time. For example, one regulator supply might be enabled initially to provide basic monitoring functions, for example during charging, but other functions may be disabled and so the regulators are disabled. In this way, the power drain due to the disabled regulators is very low.

FIGS. 7 and 8 show an alternative configuration to those described above. In this arrangement, the resistor divider networks are connected between the source reference voltage $V_{REF}$ and ground. The sequencer outputs SQA, SQB, SQC are then coupled or connected, in use, to the reference nodes along with the reference voltage inputs. This ensures that the switches 87 of the sequencer outputs do not form part of the resistor divider networks. In this way, when the regulators are operating normally, the reference input voltage is not affected by any voltage drop across the switches 87. This also means that the resistor networks can be connected to a common 'star' ground point to give an accurate ground reference.

Diodes 88 are shown in FIGS. 7 and 8 for connecting multiple resistor network dividers to a single sequencer output. This avoids the voltages at the respective nodes affecting each other. If the sequencer output was connected directly to multiple resistor divider networks, the output nodes would thus be connected together and would then be at the same voltage, which may not be desirable.

In use, the sequencer outputs SQA, SQB, SQC will be initially connected to ground through the switches 87. This will pull the voltage on the output nodes of the resistor divider networks down close to ground. Where diodes 88 are present, the voltage will not drop to ground voltage due to the diode voltage drop. Consequently, the comparator 85 is provided in a similar manner to the comparator 55 in the arrangement of FIG. 5a. However, this comparator compares the reference input voltages to a voltage close to ground rather than $V_{REF}$. The comparator is shown with a direct connection to ground for a comparison voltage. However, the voltage will have to be offset from ground potential to allow for the diode voltage drop mentioned above.

FIG. 9 shows a modified version of the arrangement of FIG. 6. In a similar manner to the arrangement of FIG. 8, the resistor divider networks are connected between the source reference voltage $V_{REF}$ and ground. The outputs from the sequencer, SQA, SQB, SQC are then connected to the output nodes of one or more of the resistor divider networks, to control the regulators. The arrangement differs from that of FIG. 8 in that the sequencer controls switches 91, 92, 93 to couple sequencer outputs SQA, SQB, SQC to a voltage source Vdd2. This may be a separate supply or the same as Vdd. Initially, the sequencer controls the switches to turn on so that the supply voltage Vdd2 is connected to the nodes of the resistor divider networks. Thus VR1, VR2 and VR3 will all be at Vdd2 (or within a diode voltage drop). The comparator 95 detects if VR1 is above $V_{REF}$ and switches off the error amplifier 64. When the sequencer wants to enable a regulator, it turns the corresponding switch 91, 92, 93 off which allows the voltage on the output node of the resistor divider network to settle to it's normal output according to the ratio of the resistors forming it. When the comparator 95 detects that the voltage VR1 has dropped below $V_{REF}$, it enables the amplifier 64 which starts to operate normally to provide a regulated supply.

As above, to avoid directly connecting the nodes of the resistor divider networks, diodes 98 are used between the outputs SQA and the node connections. Vdd2 is preferably arranged to be higher than $V_{REF}$ by at least the diode voltage drop. This makes the operation of the comparator 95 simpler as the voltage on VR1, VR2, VR3 when the sequencer outputs are enabled will be greater than $V_{REF}$ even allowing for any diode voltage drops. However, as above, the reference voltage to the comparator 95 may be internally compensated, allowing a lower voltage to be used.

Rather than using $V_{REF}$ to set the comparator threshold voltage, Vdd2 may be used, to give a threshold voltage say a diode down from Vdd2. Equally, the comparator threshold voltage may be some other value, so long as it is sufficiently higher than the normal input voltage for VR1-3, to allow proper operation.

Figure 3:
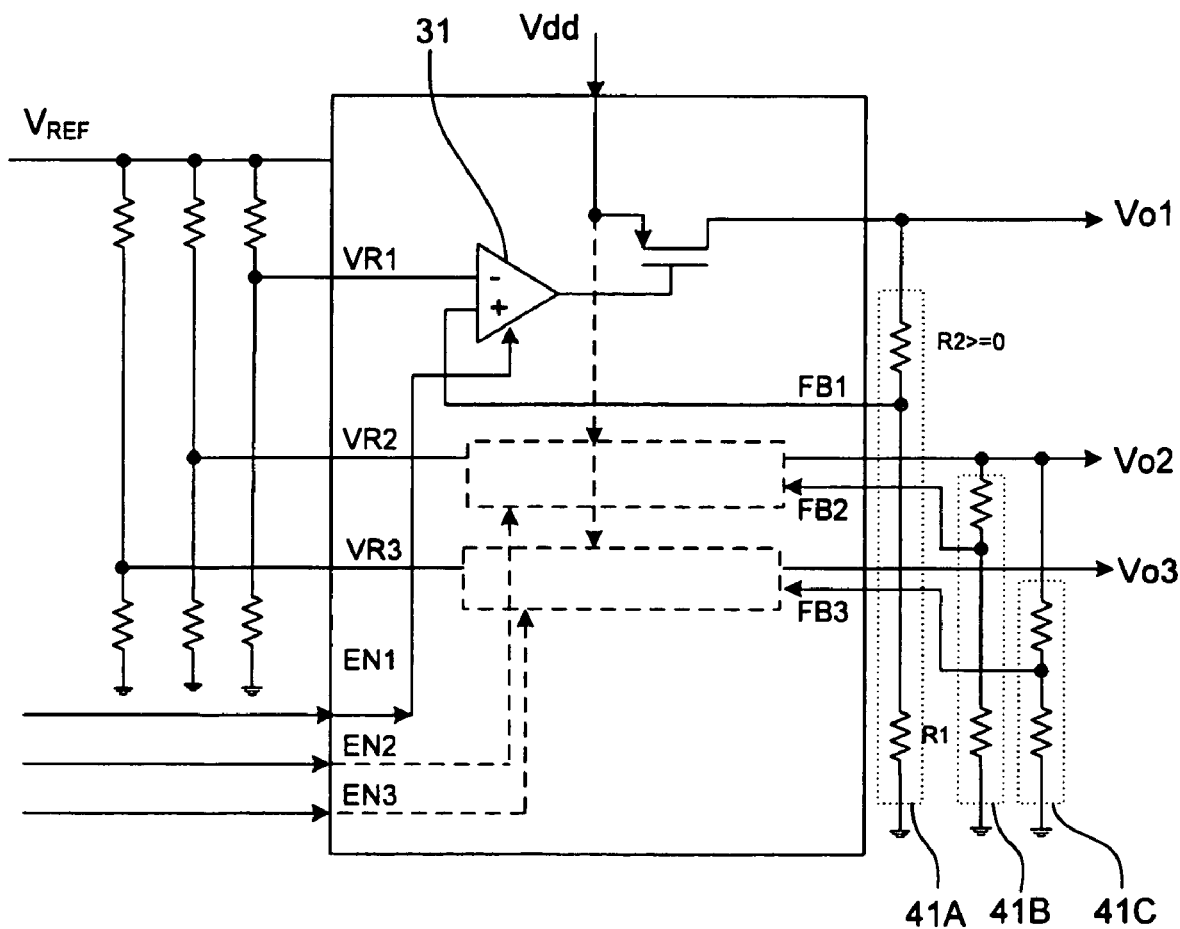
FIG. 3 shows a modified version of the IC of FIG. 2.

The arrangements shown in FIGS. 4 to 9 use a signal fed back directly from the output for controlling the output voltage. However, these arrangements can all be modified in a similar manner to the arrangement shown in FIG. 3 in which the fed back voltage is only, a portion of the output voltage, derived by using a resistor divider network connected to each output.

FIG. 10 shows a further modification of the present invention. In this arrangement, the output voltage is controlled in a different manner to the previous examples. The outputs Vo1, Vo2, Vo3 from the regulators are provided as outputs from the device. The user then selects external resistors to form a resistor divider network 71A, 71B, 71C which is placed between the outputs and ground. Each divider network 71A, 71B, 71C provides a proportion of the output voltage as a feedback to inputs FB1, FB2, FB3. These are fed back to the feedback amplifier for each regulator.

An external reference voltage $V_{REF2}$ is provided as a reference input voltage which is fed to the feedback amplifiers in each of the regulators. For example if $V_{REF2}$ is 5V and it is desired for a regulator to provide 10V as an output then the resistor network on the output of that regulator is arranged to divide the output voltage by 2 to provide a feedback which should be 5V.

In this arrangement, the sequencer is arranged to control switches which selectively connect a voltage source Vdd2 to the sequenced outputs SQA, SQB, SQC. Vdd2 may be $V_{REF}$ or Vdd or some other voltage. The user then connects the appropriate feedback input FB1, FB2, FB3 to a sequenced output to control the timing of a regulator. In the example shown, regulator 75 is to be controlled according to SQA, whereas regulators 76 and 77 are to be controlled according to SQB. In other words, FB1, FB2, FB3 act as the analogue control inputs rather than VR1, VR2, VR3. Consequently SQA is connected to FB1 and SQB is connected to FB2 and FB3. In practice where two regulators are sharing the same sequenced output, isolation diodes are used so that the outputs of the respective regulators do not affect each other in normal operation.

In use, the sequenced outputs are initially turned on and so the outputs SQA, SQB SQC are all high. This causes the feedback voltage to the inputs FB1, FB2, FB3 to go high and the feedback amplifiers turn off the regulators. Once the output SQA turns on, the switch is actually turned off and the output SQA becomes high impedance. The voltage on FB1 then drops towards ground potential. The feedback amplifier is then caused to turn the regulator on which is then controlled by the resistor divider network on the output.

This arrangement allows output voltages that are in excess of the input reference voltage $V_{REF2}$.

FIG. 11 shows a modified version of the arrangement shown in FIG. 5a. In this configuration, the output feedback resistors are brought on-chip. When closed, additional switch SW1 provides a direct feedback of the output to the amplifier 84. The regulator operates to provide a voltage equivalent to the input resistor divider output connected to VR1. Alternatively, switch SW2 may be closed. In this arrangement, the internal divider network 81 provides a portion of the regulator output voltage as the feedback signal to the amplifier 84 via switch SW2. In the first case, when each switch SW1 is closed each regulator can be selectively operated to provide a voltage corresponding to the voltage input to pins VR1, VR2, VR3 etc. In contrast, when each switch SW2 is closed, the voltage output by the respective regulator is based upon the ratio of the resistance of the internal output resistor divider network 81. A separate internal output resistor divider network 81 is provided for each regulator.

This allows the output voltage to be adjusted by varying either the reference input voltage VR1, VR2, VR3 or the output feedback voltage by controlling the switches SW1 and SW2. Furthermore, a combination of the two control mechanisms may be used. There need be no added restriction to the reference input voltage range or the output voltage range. The arrangement of these switches SW1, SW2 may be soft programmable to allow user/device selection of the mode of operation. Alternatively the switches may be formed using fusible switches or the like, that are set once and then operate in substantially the same way. This allows the same device to be used for different applications without complex external circuitry being needed.

The switch SW2 may be replaced by a number of switches, each for connecting to a node in a ladder of resistors. FIG. 12 shows such a configuration in which the resistor divider network 81 is replaced with the ladder network 81'. In this arrangement, the desired switch SW21-SW2n can be selected to provide the desired voltage output. Alternatively, the resistors of the resistor network 81 can be replaced with a soft programmable resistor, as shown in FIG. 13, possibly implemented using similar networks of switches.

The configuration of this resistor value and also the switch configurations can be controlled by a serial interface to the device. This interface may already be present on the device to control other functions, particularly if the device also contains major blocks of other circuitry for example an audio codec or communications modem.

The modification shown in FIGS. 11 to 13 can equally be applied to the alternative configurations of FIGS. 6 to 10 to allow internal control of the voltage output.

To provide for additional flexibility, one or more of the sequencer outputs SQA, SQB, SQC may be arranged to be programmed into a tri-state output mode. This would allow each such output pin, say SQA, to serve as an input in an alternative mode of operation where SQA becomes a logic input which may act either directly as an enable input to a regulator or via some intermediate logic circuitry. In this mode, the SQA pin is not switched by the sequencer but instead provides an input to manually control the operation of a respective regulator, perhaps under the control of some external processor, once the rest of the system is powered up. The device can be switched into this mode in a number of ways, for example by an additional external selector pin, or by detecting when there are no resistors connected to the respective pin.

This allows the device to serve multiple functions, including the traditional externally enabled regulator function as well as the function of the invention described above.

In the above arrangements, the sequencer is controlled by an input clock, SQCLK. However, as mentioned above, the sequencing could be controlled by separate logic or analogue inputs or by external timing components such as resistor/capacitor combinations or the like.

The device may include additional comparators to detect whether one regulator supply is fully operational before starting the next one. This can be important where the first supply is used to control a device which must be stable before another device is started, for example by the second supply. One situation is where a signal processor provides an audio output signal to an output amplifier. The processor needs to be started and stable before the amplifier starts, to ensure the input to the amplifier is stable and so avoid undesirable output noise.

Different applications may have different amounts of decoupling capacitance, which may affect the start up time of a supply, and so by having an internal check that the supply is fully operational, such effects can be mitigated.

Figure 1:
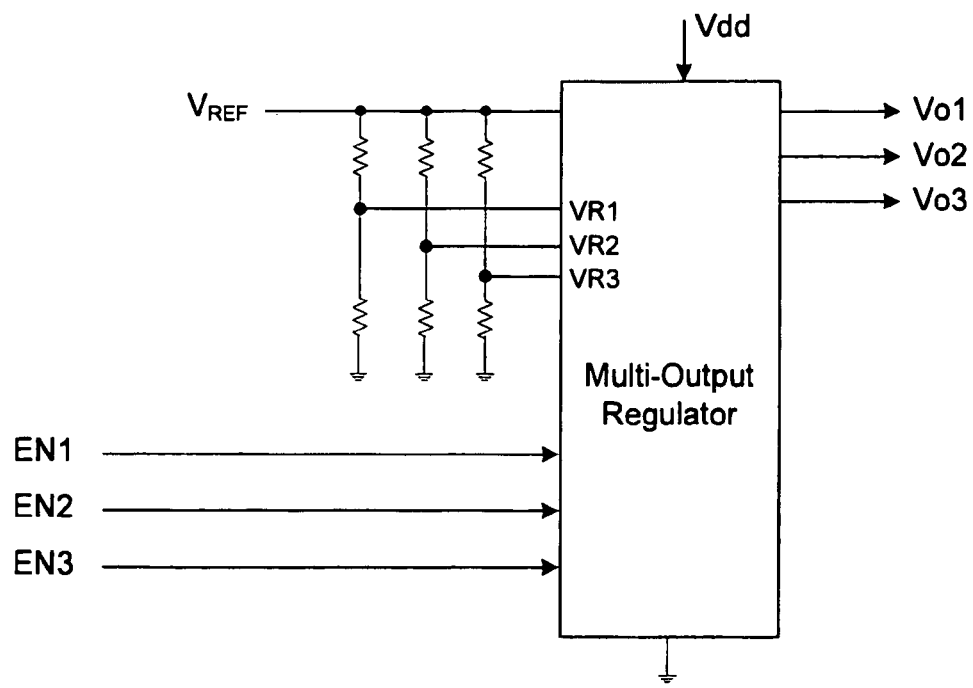
FIG. 1 shows an example of a basic sequence controlled power management IC.
Figure 2:
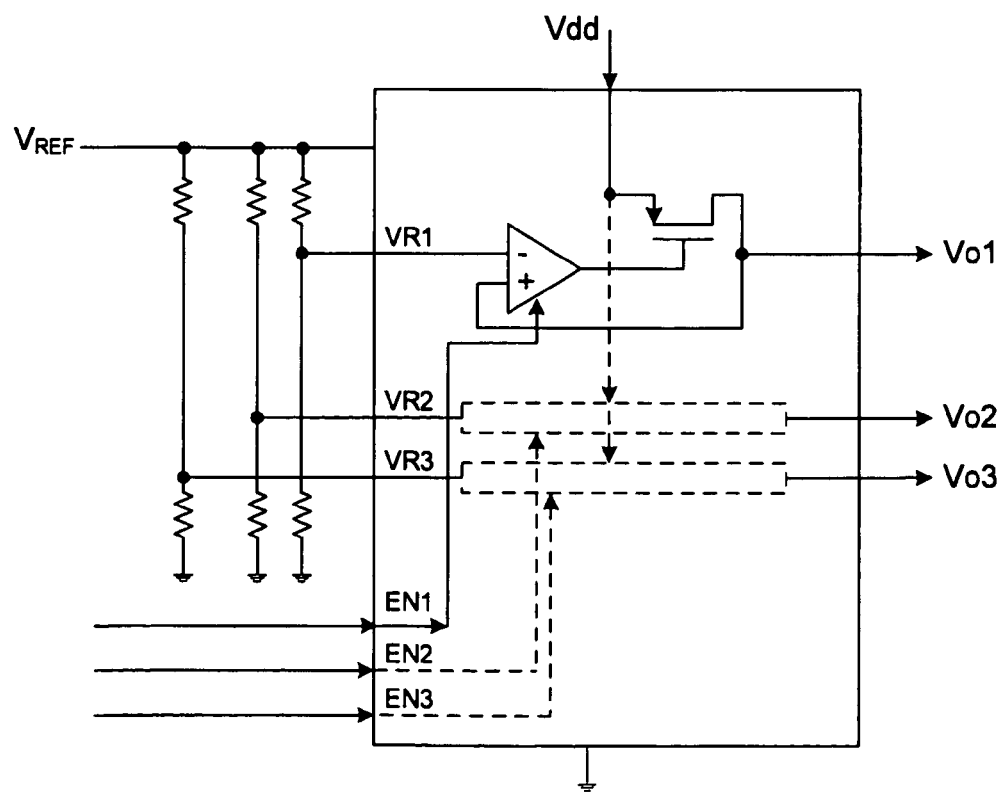
FIG. 2 shows in more detail the structure of the IC of FIG. 1.

The above described arrangements of the present invention provide a device that has two terminals or connections (Vo & VR or Vo & FB) per regulator and one terminal (SQ) for each sequencer output. This provides a more efficient ratio of regulators to terminals than say the example of FIGS. 1 and 2 where each regulator requires 3 terminals (EN, VR, Vo). Thus a device could have say 8 regulators and 3 sequencer outputs using 19 terminals compared to 24 required for the prior art. This would allow an integrated circuit device to be built with fewer terminals, hence using a package with fewer pins or leads, and hence cheaper or smaller. Alternatively the pins saved from a given package may be used to allow extra functions.

A further embodiment of the present invention is shown in FIG. 14. This design is arranged such that it could be operated in many of the above modes. This circuit similarly includes a number of regulators 146, 147, 148 and has inputs VR1, VR2, VR3 for receiving reference input voltages. It also has fed-back voltage inputs FB1, FB2, FB3, sequencer outputs SQA, SQB, SQC and output voltage outputs Vo1, Vo2, Vo3. The mode of operation of the device may be defined by a control bus during power-up initialisation, or possibly by an on-chip EEPROM, programmed fuses or similar.

Depending upon the chosen configuration, in operation the sequencer outputs SQA, SQB, SQC may be driven high, low, or high-impedance. The outputs are controlled by the bank 141 of sequencer controlled switches. According to the chosen configuration of the sequencer logic, the drives applied from the sequencer to the switches in the bank 141 will cause the outputs SQA, SQB, SQC to be connected to ground, to the second supply Vdd2 or left in a high impedance mode. The design of appropriate sequencer logic for a desired configuration will be apparent to those skilled in the art.

Regulator 146 will now be described. Regulators 147 and 148 may be of the same design or, as mentioned above, be of a different design, e.g. boost, buck, etc. The error amplifier is similar to those in the previous embodiments but is controlled by a controller 145 which can disable the amplifier to turn the regulator output off. The controller 145 determines whether to enable the amplifier according to one or more of a number of comparators 142, 143, 144 which are provided to monitor the reference input voltage VR1 and the fed-back voltage input FB1. Comparator 142 compares the reference input voltage with the source reference voltage. Comparator 143 compares the reference input voltage with the ground reference. Comparator 144 compares the fed-back voltage with Vref3 which may be Vref, Vref2, or Vdd2 (or some other reference). Appropriate offsets may be applied to the comparator references as discussed above.

As suggested above, the three comparators 142, 143, 144 may be used sequentially with each regulator. In this way, only three comparators are needed for all the regulators.

Furthermore, the regulators may be sequenced in timescales of typically tens of milliseconds. The comparators 142, 143, 144 will generally be capable of responding in much shorter timescales. Thus, it would be possible to replace the comparators by a single comparator, switched sequentially between the various pairs of input voltages required. Indeed the comparators for multiple channels might all the replaced by a single comparator. This will save chip area and hence cost, at the expense of a little control logic and the requirement for a suitable clock, available even on power-up.

This embodiment allows a common silicon design to be used for a wide range of applications, by using whichever of the previously described modes that is most suited to a particular application. This gives advantage over more specific solutions in terms of ease and cost of inventory control, larger and hence cheaper production runs, amortisation of non-recurring engineering costs. It eases system design, since a system designer only has to learn the functions of a single part, and also allows alteration of functionality late in the design cycle to solve last minute design problems or cope with last-minute specification changes.

FIG. 15 shows an application of this circuitry in a battery operated portable media device, for example a portable MP3 player. The PMIC or similar circuits according to the invention could be used in many other applications than this example, for example mobile phones with or without MP3 player capability.

In this embodiment, the PMIC also comprises a band-gap-based reference generator (VBG) circuit to generate an appropriate reference voltage $V_{REF}$, a power-on-reset (POR) circuit to generate the START signal and to start an oscillator to provide the sequencer clock SQCLK. The power supply Vdd is derived from a battery delivering a voltage between, say Vb1 and Vb2. The PMIC comprises a high current buck-boost switching regulator (Sw Reg1) to generate a voltage V1 between Vb1 and Vb2 to power a disc drive connected to Vo1. The PMIC also comprises a second buck-boost switching regulator (Sw Reg2), operating in buck mode in this case, to provide a voltage V2 less than Vbatmin, the minimum battery voltage, at its output Vo2 for the digital applications processor that controls the system after power-up. The PMIC also includes an LDO to provide a clean, stable, supply $AV_{dd}$ at a voltage V3 slightly less than Vbmin for the analog circuitry in an audio codec connected to Vo3. The Vo2 supply is also used to provide the digital supply $DV_{dd}$ for the digital circuitry on this chip.

The PMIC circuitry and the audio codec may be integrated on the same chip. Other functions may be included on a common chip with a PMIC according to the present invention.

Normally the circuit will be configured to sequence Vo2 on first, controlled via SQA and VR2. This allows digital initialisation of the system. Subsequently, SQB is enabled initiating the disc drive supply Vo1 based on VR1. This allows access to further initialisation data on the disc drive. Finally, the audio codec supply Vo3 is enabled via SQC and VR3.

The PMIC is readily re-configurable, for example for a system with a lower voltage application processor, or a system with flash memory instead of the disc drive, requiring a power supply voltage V4>Vbmax, in which case SwReg1 will operate as a boost converter. Equally, the connections to SQA, SQB, and SQC may be configured for an application where the audio codec is required to be powered up second, to receive audio from say a wireless receiver circuit in a mobile phone rather than the disc drive.

Inclusion of a power on reset (POR) and voltage band gap (VBG) reference advantageously allows system start-up to be controlled and sequenced predictably by the PMIC rather than by relying on some part of some other chip(s) to give appropriately timed POR signals.

The embodiments above use two-resistor resistor dividers such as 41A to derive a reference voltage from another. Alternative embodiments may use other voltage derivation circuits in place of these. FIG. 16(a) illustrates a simple two-resistor divider as already shown as 41A, with input node voltages V1 and V2 and output node voltage V3.

FIG. 16(b) illustrates the possibility of using a resistor network of more than two resistors, where in this case a third resistor is switchable to allow programmability of output voltage. FIG. 16(c) illustrates the possibility of using a zener diode or other breakdown diode to provide an output reference voltage. In use, the diode could be shorted to V2 by the sequencer outputs when the respective regulator is to be disabled, but allowed to pass current and thus establish a reference breakdown voltage when the respective regulator is to be enabled. Similarly a light-emitting diode may replace the zener diode as in FIG. 16(d), or an accurate two-terminal reference integrated circuit as in FIG. 16(e). Other possible voltage derivation networks will be obvious to those knowledgeable in the art.

The invention has been described above in terms of specific embodiments. It should be noted that the above described embodiments illustrate rather than limit the invention, and that those skilled in the art will be able to design many alternative embodiments without departing from the scope of the appended claims and drawings. The word "comprising" does not exclude the presence of elements or steps other than those listed in a claim, "a" or "an" does not exclude a plurality, and a single element may fulfil the functions of several elements recited in the claims. Any reference signs in the claims shall not be construed so as to limit their scope.

The invention claimed is:

1. A power management device comprising an integrated circuit and one or more voltage networks, the integrated circuit comprising:
   a plurality of power regulators, each regulator comprising a regulator input and a regulator output, wherein each power regulator is controlled according to the voltage on the respective regulator input;
   a sequencer for providing a plurality of sequencer outputs;
   a plurality of integrated circuit outputs, each coupled to a respective power regulator output;
   a plurality of integrated circuit inputs, each coupled to a respective power regulator input; and
   a plurality of integrated circuit sequencer outputs, each coupled to a respective sequencer output;
   wherein
   the voltage networks each have input voltage nodes and an output voltage node and each integrated circuit sequencer output is coupled to a node of one or more of said voltage networks, to modify the voltage on the output voltage node of said one or more voltage networks, and
   each integrated circuit input is coupled to the output voltage node of a respective one of said one or more voltage networks.

2. A device according to claim 1 wherein the integrated circuit is provided with a lower voltage source input for connecting to a lower voltage source and an upper voltage source input for connecting to an upper voltage source, and the sequencer selectively couples the sequencer outputs to said lower voltage source input to couple the respective one or more voltage networks to said lower voltage source and wherein each power regulator is disabled when the voltage on the respective device input is within a first predetermined range.

3. A device according to claim 2 wherein, in use, the voltage network has upper and lower reference voltage input nodes with the output voltage node providing a voltage between the voltages on the upper and lower reference voltage input nodes, and
   the sequencer outputs are coupled to the lower reference voltage node of the respective voltage network.

4. A device according to claim 3 wherein the first predetermined range is at or above a first threshold voltage.

5. A device according to claim 4 wherein the first threshold voltage is below an upper voltage source.

6. A device according to claim 2 wherein the first predetermined range is at or above a first threshold voltage.

7. A device according to claim 4 wherein the first threshold voltage is below an upper voltage source.

8. A device according to claim 2 wherein, in use, the voltage network has upper and lower reference voltage input nodes with the output voltage node providing a voltage between the voltages on the upper and lower reference voltage input nodes, and
   the sequencer outputs are coupled to the output voltage node of the respective voltage networks.

9. A device according to claim 8 wherein the first predetermined range is at or below a second threshold.

10. A device according to claim 9 wherein the second threshold is above the lower voltage source.

11. A device according to claim 2 wherein the first predetermined range is at or below a second threshold.

12. A device according to claim 11 wherein the second threshold is above the lower voltage source.

13. A device according to claim 2 wherein each power regulator includes a comparator for determining if the voltage on the respective input is in the first predetermined range.

14. A device according to claim 1, wherein the integrated circuit is provided with a lower voltage source input for connecting to a lower voltage source and an upper voltage source input for connecting to an upper voltage source, and the sequencer selectively couples the sequencer outputs to the upper voltage source, to couple the respective one or more voltage networks to said upper voltage source and wherein each power regulator is disabled when the voltage on the respective input is within a second predetermined range.

15. A device according to claim 14, wherein each voltage network has upper and lower reference voltage input nodes and, in use, the output voltage node provides a voltage between the voltages on the upper and lower reference voltage nodes, and
   the sequencer outputs are coupled to the upper reference voltage input node of the respective voltage networks.

16. A device according to claim 15 wherein the second predetermined range is at or below a third threshold.

17. A device according to claim 16 wherein the third threshold is above the lower voltage source.

18. A device according to claim 14 wherein the second predetermined range is at or below a third threshold.

19. A device according to claim 18 wherein the third threshold is above the lower voltage source.

20. A device according to claim 14, wherein each voltage network has upper and lower reference voltage nodes and, in use, the output voltage node provides a voltage between the voltages on the upper and lower reference voltage nodes, and
   the sequencer outputs are coupled to the output voltage nodes of the respective voltage networks.

21. A device according to claim 20 wherein the second predetermined range is at or above a fourth threshold.

22. A device according to claim 21 wherein the fourth threshold is below the upper voltage source.

23. A device according to claim 14 wherein the second predetermined range is at or above a fourth threshold.

24. A device according to claim 23 wherein the fourth threshold is below the upper voltage source.

25. A device according to claim 14 wherein each power regulator includes a comparator for determining if the voltage on the respective input is in the second predetermined range.

26. A device according to claim 1 wherein the integrated circuit is provided with a lower voltage source input for connecting to a lower voltage source and an upper voltage source input for connecting to an upper voltage source, and the sequencer selectively couples the sequencer outputs to the upper voltage source to couple the respective voltage networks to said upper voltage source, wherein each power regulator is disabled when the voltage on the respective input is within a third predetermined range.

27. A device according to claim 26 wherein,
each external voltage network has upper and lower reference voltage nodes and, in use, the output voltage node provides a voltage between the voltages on the upper and lower reference voltage nodes, and
the sequencer outputs are coupled to the output voltage nodes of the respective voltage networks.

28. A device according to claim 27 wherein each upper reference voltage node is connected to a respective regulator output.

29. A device according to claim 28 wherein the third predetermined range is at or above a fifth threshold.

30. A device according to claim 27 wherein the third predetermined range is at or above a fifth threshold.

31. A device according to claim 27 wherein the third predetermined range is at or above a fifth threshold and the fifth threshold is below said upper voltage source.

32. A device according to claim 28 wherein the third predetermined range is at or above a fifth threshold and the fifth threshold is below said upper voltage source.

33. A device according to claim 26 wherein the third predetermined range is at or above a fifth threshold.

34. A device according to claim 26 wherein the third predetermined range is at or above a fifth threshold and the fifth threshold is below said upper voltage source.

35. A device according to claim 26 wherein each power regulator includes a comparator for determining if the voltage on the respective input is in the third predetermined range.

36. A device according to claim 1 wherein the sequencer outputs can be selectively coupled one of a lower voltage source and an upper voltage source.

37. A device according to claim 1 wherein the sequencer outputs can be switched to a high impedance mode.

38. A device according to claim 37 wherein the regulators can be selectively enabled by inputs provided to respective sequencer outputs when they are in a high impedance mode.

39. A device according to claim 1 further comprising at least one controller, each controller being adapted for selectively enabling one or more of the regulators.

40. A device according to claim 39 wherein each controller selectively enables a regulator based upon a comparison between at least one of: the regulator input and a lower voltage source; the regulator input and an upper voltage source; and a fed back regulator input and said upper voltage source.

41. A device according to claim 1 wherein the sequencer is arranged to sequentially switch on the sequencer outputs with a delay between each.

42. A device according to claim 41 wherein the delay between each sequencer being switched on is controlled by an externally provided timing signal to the sequencer.

43. A device according to claim 1 wherein the sequencer is arranged to delay the switching of a sequencer output until after a previous sequencer output has been switched on and any regulators controlled by it are fully operational.

44. A device according to claim 1 further comprising a sequencer control input for controlling the timing of the switching of the sequencer outputs.

45. An device according to claim 1 in combination with a load device selected from the group consisting of: a disc drive, a flash memory module, an applications processor, an audio codec, a video codec, and a wireless transceiver.

46. An device according to claim 1 wherein said voltage networks form part of said device.

47. An device according claim 46 wherein the characteristics of said voltage networks are externally selectable.

48. An device according claim 47 wherein said voltage network comprises a plurality of resistors whose values are externally selectable.

49. A portable media device comprising a device according to claim 1.

50. A power management system comprising an integrated circuit and one or more voltage networks, the integrated circuit comprising:
a plurality of power regulators, each regulator comprising a regulator input and a regulator output, wherein each power regulator is controlled according to the voltage on the respective regulator input;
a sequencer for providing a plurality of sequencer outputs;
a plurality of output pins, each coupled to a respective power regulator output;
a plurality of input pins, each coupled to a respective power regulator input; and
a plurality of sequencer outputs, each coupled to a respective sequencer output;
wherein
the voltage networks each have input voltage nodes and an output voltage node, and each integrated circuit sequencer output is coupled to a node of one or more of said voltage networks to modify the voltage on the output voltage node of said one or more voltage networks, and
each input pin is couplable to the output voltage node of a respective one of said one or more voltage networks.

51. A method of controlling a power management integrated circuit comprising a sequencer and a plurality of power regulators, the power management circuit being for use with one or more voltage networks having input voltage nodes and an output voltage node, the method comprising:
receiving a sequencer control signal at said sequencer;
switching each of a plurality of integrated circuit sequencer outputs in response to said sequencer control signal, each integrated circuit sequencer output being for selectively controlling the output of one or more of said voltage networks, wherein each said integrated circuit sequencer output signals is coupled to one or more of said voltage networks to modify the voltage on the output voltage node of said controlled voltage networks; and
controlling the operation and output voltage of said regulators according to a received input reference voltage from a respective one of said voltage networks.

52. A method according to claim 51 wherein said integrated circuit has a lower voltage source input and an upper voltage source input and wherein:
said switching comprises switching said integrated circuit sequencer outputs to said lower voltage source to selectively couple the respective one or more voltage networks to said lower voltage source; and
each power regulator is controlled to be disabled when the voltage on the respective received input reference is within a first predetermined range.

53. A method according to claim 52 wherein the external voltage network has upper and lower reference voltage input nodes with the output voltage node providing a voltage between the voltages on the upper and lower reference voltage input nodes, and
said switching comprises selectively coupling a said integrated circuit sequencer output to the lower reference voltage input node of said respective one or more voltage networks.

54. A method according to claim 52 wherein the external voltage network has upper and lower reference voltage input nodes with the output voltage node providing a voltage between the voltages on the upper and lower reference voltage input nodes, and said switching comprises selectively coupling said integrated circuit sequencer output to the output voltage node of said respective one or more voltage networks.

55. A method according to claim 51 wherein said integrated circuit has a lower voltage source input and an upper voltage source input and wherein:

said switching comprises switching said integrated circuit sequencer outputs to said upper voltage source to selectively couple the respective one or more voltage networks to said upper voltage source; and each power regulator is controlled to be disabled when the voltage on the respective received input reference is within a second predetermined range.

56. A method according to claim 55 wherein the voltage network has upper and lower reference voltage input nodes with the output voltage node providing a voltage between the voltages on the upper and lower reference voltage input nodes, and said switching comprises selectively coupling said integrated circuit sequencer output to the upper reference voltage input node of said respective one or more voltage networks.

57. A method according to claim 55 wherein the voltage network has upper and lower reference voltage input nodes with the output voltage node providing a voltage between the voltages on the upper and lower reference voltage input nodes, and said switching comprises selectively coupling said integrated circuit sequencer output to the output voltage node of said respective one or more voltage networks.

58. A method according to claim 51 wherein said integrated circuit has a lower voltage source input and an upper voltage source input and wherein:

said switching comprises switching said integrated circuit sequencer outputs to said upper voltage source to selectively couple the respective one or more voltage networks to said upper voltage source; and each power regulator is controlled to be disabled when the voltage on the respective received input reference is within a third predetermined range.

59. A method according to claim 58 wherein, the external voltage network has upper and lower reference voltage input nodes with the output voltage node providing a voltage between the voltages on the upper and lower reference voltage input nodes, and said switching comprises selectively coupling a said said integrated circuit sequencer output to the output voltage node of said respective one or more voltage networks.

\* \* \* \* \*